July 19, 1927.  1,636,120
H. BRANDENBERGER
SHAPING OR PLANING MACHINE FOR WORM OR SCREW SHAPED BEVEL WHEEL OPERATING
ACCORDING TO THE DEVELOPMENT METHOD
Filed Dec. 21, 1923    4 Sheets-Sheet 3

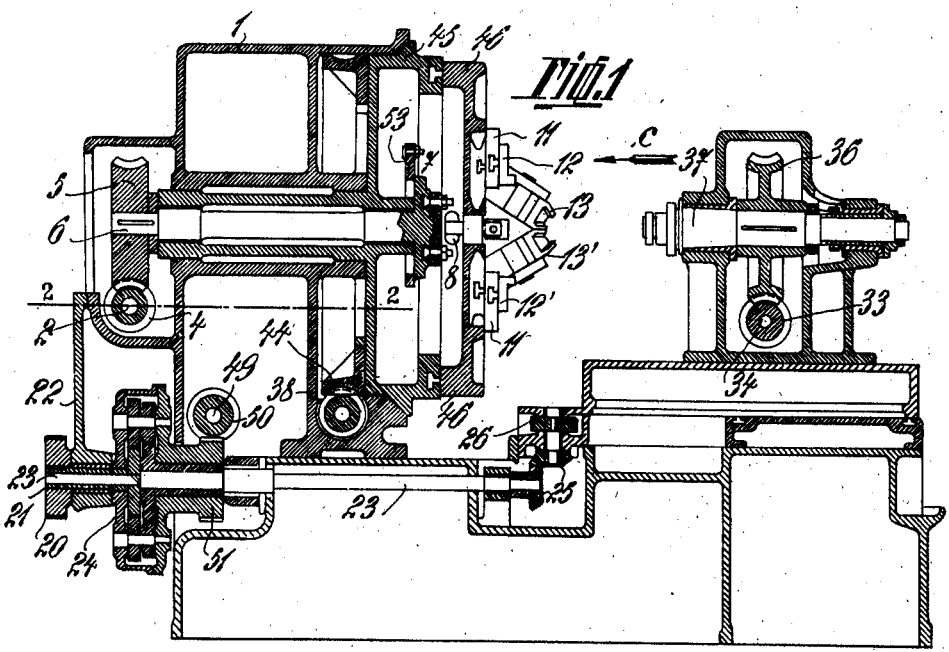

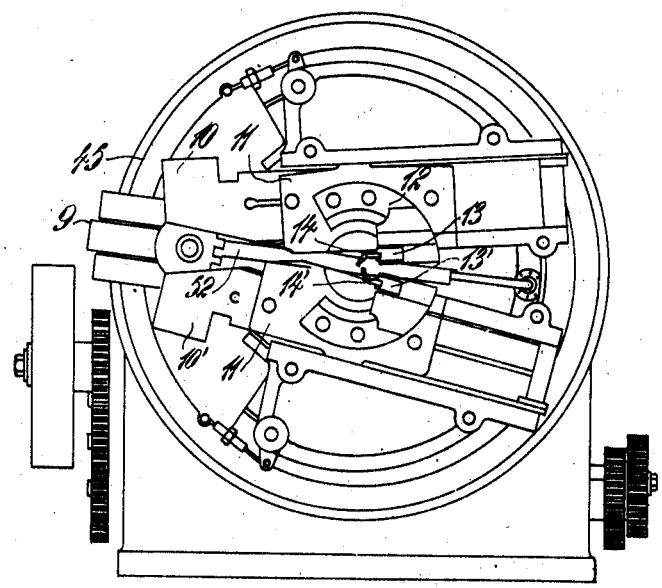
Fig. 3
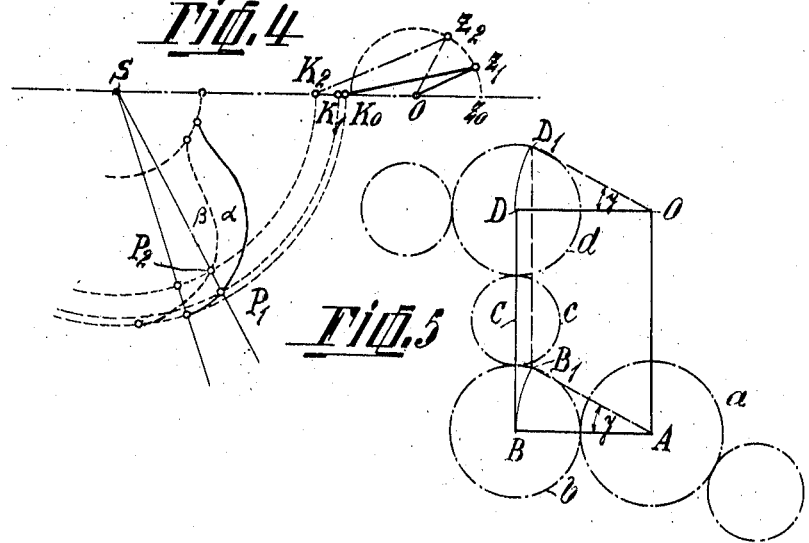
Fig. 4
Fig. 5

Inventor
H. Brandenberger
By Marks & Clerk
Attys.

Patented July 19, 1927.

1,636,120

UNITED STATES PATENT OFFICE.

HEINRICH BRANDENBERGER, OF VIENNA, AUSTRIA.

SHAPING OR PLANING MACHINE FOR WORM OR SCREW SHAPED BEVEL WHEEL OPERATING ACCORDING TO THE DEVELOPMENT METHOD.

Application filed December 21, 1923, Serial No. 682,110, and in Austria December 23, 1922.

This invention relates to a shaping or planing machine for worm- or screw-shaped bevel wheels operating according to the development method, in which the worm or screw shape of the teeth is developed by the relative movement between the straight line motion of the cutter and the continuously rotating bevel wheel, so that the machine can operate without a dividing device. Hitherto in the known machines the additional stroke or lift of the tool produced by the developing motion of the plane wheel or pinion has not been taken into consideration, so that incorrectly shaped teeth were produced. The present invention has for the object to remove this drawback.

One mode of carrying out the present invention is shown by way of example on the accompanying sheets of drawings in which—

Fig. 1 is a longitudinal section through the machine,

Fig. 2 a plan view of the latter but partly in section according to line 2—2 of Fig. 1, and Fig. 3 a view of the tool-slide as seen in the direction of the arrow C of Fig. 1.

Fig. 4 illustrates the surface of the bevel wheel as spread out in a plane with the curves, which the tool produces on the dividing cone.

Fig. 5 shows diagrammatically and by way of example the drive or operation of the cutting tool on the movable pinion or plane wheel.

Figure 6:
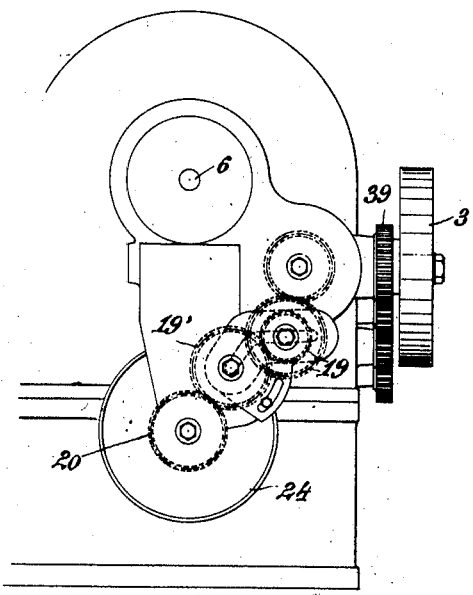
Fig. 6 is an elevation of the machine looking in the direction opposite to that indicated by the arrow C in Fig. 1.

A shaft 2 with a driving pulley 3 is located on the pinion-casing 1. A worm 4, secured upon the shaft 2, meshes with a worm wheel 5 which is keyed to a crankshaft 6, the crank pin 7 of the latter moving by means of a connecting rod 8 the crosshead 9, which operates the two rams 10 and 10'. Slide-supports 11 and 11', slides 12, 12', knife or cutter holders 13, 13' and the knives or cutters 14, 14' are mounted on the said rams (Fig. 3).

Further a bevel wheel 15 (Fig. 2), meshing with a bevel wheel 16 keyed to the shaft 17, is mounted on the shaft 2. The shaft 17 carries a spur gear wheel 18 which by means of the toothed wheels 19 and 19' is in connection with a gear wheel 20, keyed to a loose sleeve 21 (Fig. 1) which is mounted in the part 22 of the machine and serves as the bearing of a shaft 23. A wheel 24 mounted on the sleeve 21 rotates the shaft 23 through a spur wheel differential gear. By the pair of bevel wheels 25 this rotation is transmitted to the spur wheel 26 which by means of the wheels 27 and 28 and the pair of bevel wheels 29 operates the grooved shaft 30. A bevel wheel 31 is by means of a feather or key slidably mounted on the grooved shaft 30 and the wheel 31 is in mesh with a bevel wheel 32 which by means of a shaft 34, disposed in the workpiece head stock, is connected with the worm 33. The workpiece is secured to the shaft 37 and by means of the worm wheel 36 the latter is placed into continuous rotation, whereby the knives or cutters produce screw-shaped or helical cuts on the workpiece during the operation.

Also the worm 38 on the shaft 43 is driven by the shaft 2 through the medium of the spur wheels 39, 40, 41 and 42. The worm 38 meshes with a worm wheel 44 (Fig. 1) which is fast with the face plate 45 and thus produces the developing motion of the plate 45. The ram guides 46 and 46' are movably screwed in a circle to the plate 45 and the rams 10 and 10' move in the same, thus carrying out the developing motion of the face plate.

Further the spur wheel 47 is mounted on the shaft 43 and is in connection with the shaft 49 by means of the gear wheels 48, a worm wheel 50 being keyed to the shaft 49 and meshing with a planet wheel casing 51 provided with a worm wheel toothing, whereby the workpiece on the shaft 37 will have imparted thereto, besides the rotation of the main drive, an additional rotation, depending upon the face plate motion, e. g., the development movement.

If the cutter-drive, e. g. the worm 4 would carry out the development movement of the face plate 45, the knives or cutters 14, 14' would remain always in the same relative position to the plate 45. Now as the worm 4 is fixed and does not carry out the development movement, the knives 14 and 14' receive during the movement of the face disc an additional stroke or lift.

In Fig. 4 by which this is explained, O S is the path of the point K (which corresponds to the pin of the cross head 9 of the machine) on the plane wheel or face plate, O being the axis of the crank shaft 6, Z the centre of the crank pin 7, thus K Z corresponds to the connecting rod 8. S is the common point of the cone of the work-piece and plane wheel. The developed surface of the work-piece is indicated below O S. The rotation of the work-piece for producing the worm teeth may be displaced or substituted by a rotation of the developed surface about S. Now the point K describes during its to- and fro movement along O S on the work-piece a curve $\alpha$. The dead centre position O $Z_0$ $K_0$ corresponding to the point $P_0$ of the curve $\alpha$, a crank position O $Z_1$ $K_1$ to the point $P_1$ in which the tooth-curve on the wheel shall actually commence. Now if the plane wheel and work-piece have rolled off or developed for a certain extent, the point K would have to describe the same curve as before in order that theoretically correct teeth will be produced on the work-piece. This would mean that for the position of the surface of the work-piece determined by the straight $P_1$ S also the crank position O $Z_1$ is again present. This would be the case if, as above indicated, the crank drive would carry out this development movement with the plane wheel. In practice this is not the case, the worm H does not move and thus during the rolling off or development movement of the plane wheel this is relatively rotated towards 4 and 5, therefore against the tool drive to the point 7 (Z). The cross-head guide carries out the plane wheel movement and the crank O Z not, e. g. the position of the crank (O Z) with respect to the connecting rod (Z K) will be different as before. Therefore not any more the crank position O $Z_1$ $K_1$ but the position O $Z_2$ $K_2$ will correspond to the position S $P_1$, as on the plane wheel relative to the same the dead centre position of the crank will be different. Therefore just now the curve $\beta$ will be described, the effective tooth-curve will commence at $P_2$ and incorrect teeth would be produced.

The above described additional stroke or lifting movement of the tool may be compensated according to the invention in that an additional rotary motion is imparted to one of the three drives for the development movement of the tool, e. g. the producing plane wheel, rolling off or development movement of the work-piece or cutting movement of the tool.

Since every rotary motion of the crank drive 7 of the tools 14 and 14' corresponds to a rotary motion of the work-piece on 37, the development movement corresponding to the movement of the plane wheel 45 may be imparted to the tools 14, 14' instead of the workpiece on 37. Thus on principle it is immaterial which of the two movements, whether the rotary motion of the work-piece or the cutting movement of the tool, is increased by the development movement. If the development movement is transferred to the tools, the same may be combined with the above mentioned additional rotation and the cutting movement may be influenced by a differential. In the illustrated embodiment the additional lifting motion which arises during the development movement has been compensated for by an additional rotation of the work-piece and combined with the development movement of the work-piece, which is expressed in the calculation of the gear wheels 47, 48.

The additional rotation of the work-piece including its development movement is produced by the spur wheel differential gear 51.

Also the tool drive may be formed in such a manner, that the additional lifting movement does not arise, e. g. the additional compensating movement is transferred into the tool drive.

Figure 7:
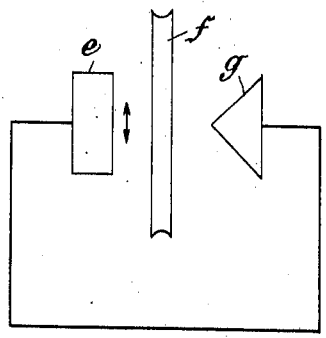
Figs. 7 to 10 are diagrammatic views illustrating the manner in which the positive connection between the work piece and tool according to the rotation of the plane wheel, can be influenced.

In Fig. 7 the actuating mechanism of the machine is diagrammatically illustrated; $e$ is the tool driving crank pin disc, $f$ the plane wheel, and $g$ the work piece drive. A double arrow indicates the reciprocating movement of the cutting tool or tools which is effected by the pin of the crank disc $e$.

According to the working principles of the machines wherein the work piece is continuously rotated, the tool drive $e$ and the work piece drive $g$ must be coupled with each other by a positive connection, for instance, gears which are driven from the outside from any source of power.

Figure 8:
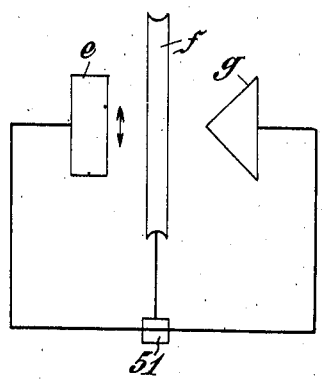

When, according to the amplitude of the feeding movement, the plane wheel $f$ is rotated, the work drive $g$ must be entrained into the rolling off or development movement which is effected in a known manner, for instance, by a toothed segment or as indicated, for example, in the embodiment Figs. 1–3 by change speed gears in connection with a planetary gear, whereby, according to the rotation of the plane wheel, the additional development movement or rolling-off movement is imparted to the work piece. This, again, is indicated diagrammatically in Fig. 8.

As each turning movement of the work piece corresponds to a turning movement of the tool, it is pointed out that instead of imparting the rolling-off or development movement to the work piece, it can be imparted to the tool.

As the drive of the tool at $e$ is entrained in the rotary movement of the plane wheel, the tool would, in a movement of the plane wheel, perform an additional stroke which is avoided according to the present invention. The stroke movement which is caused by the rotation of the plane wheel $f$ in the crank drive is compensated, according to the invention, the positive connection between the work piece and the tool being influenced according to the rotation between the work piece and tool. Constructively, this can be achieved in various manners. In Fig. 5, for example, an embodiment is shown, in which the drive of the tools is effected through a crank quadrangle.

Fig. 5 shows a preferable construction.

O is the axis of the plane wheel, A the centre of driving gear wheel disposed in the fixed place, D the centre of the gear wheel mounted on the plane wheel, from which the tool-crank is driven. A B and D B indicate the cranks movably disposed at both sides on which the gear wheels $a, b, c, d$ are arranged. The lengths of the cranks are such, that the point of rotation A, B, D and the axis O of the plane wheel form a parallelogram. Now if the plane wheel rotates about the axis O and if for instance D is rotated to $D_1$, the crank point B will be moved to $B_1$ in such a manner, that A $B_1 D_1$ and O always form a parallelogram. The numbers of teeth of the wheels $a, b, c, d$ may be such, that when the wheel $a$ is at a standstill (opposite the fixed place) the plane wheel is moved (for instance from D to $D_1$) without that the wheel $d$ will rotate with respect to the plane wheel.

In order to determine for this preferable construction the proportion between the number of teeth, which satisfies this condition it has to be imagined at first, that the wheels $b, c, d$ are fast on B D and the plane wheel is rotated through the angle $\phi$, now the wheel $d$ is moved back for the angle $\phi$, so that it will come into the original position with respect to the plane wheel. In order to bring the toothed wheel $a$ with respect to the fixed place into the same position, first the wheel $b$ is turned back for the angle $\phi$, so that the two wheels $a$ and $b$ will come into engagement with the original teeth and now the wheel $a$ is turned for the angle $\phi$ into its former position (with respect to the fixed place). As the rotations with which the wheel $b$ is imparted by the rotations of the wheels $d$ and $a$ are to be alike, the following conditions may be made in case $a, b, d$ indicate the diameters of the pitch circles of the corresponding wheels.

$$\frac{d}{2} \cdot \phi = \frac{b}{2} \phi + \frac{a}{2} \phi$$

or $$d = b + a$$

a condition which can be easily satisfied.

The additional movement of the tool or tools, which is caused by the movement of the plane wheel, is so compensated for that, according to the rotation of the plane wheel, the cranks A B and B D, Fig. 5, are also turned, so that the wheels, $a, b, c, d$, mounted thereon, which represent a part of the positive connection between work piece and tool, are influenced according to the rotation (or angle of rotation) of the plane wheel. It is also possible to lead the tool drive over a planetary gear-drive, and to impart to the planetary gear-drive a certain rotation according to the rotation of the plane wheel, so that the positive connection between work piece and tool is influenced according to the rotation of the plane wheel.

Figure 9:
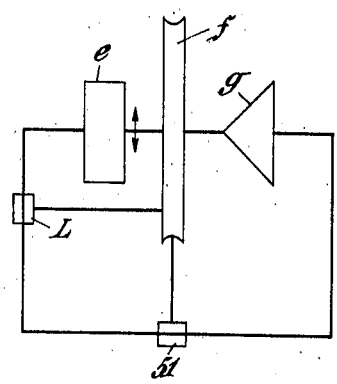

The constructions which have been described at first as examples are diagrammatically illustrated by Fig. 9, in which L designates a crank quadrangle or planetary gear-drive or another mechanism which is suitable to compensate the additional movement of the tool, caused by the movement of the plane wheel by influencing the positive connection between work piece and tool, according to the rotation of the plane wheel.

Figure 10:
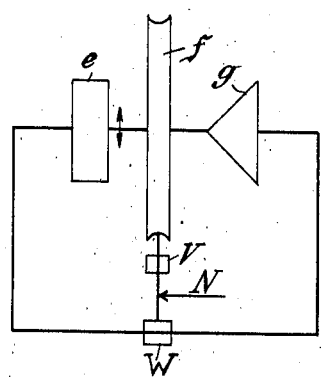

The influencing of the positive connection between work piece and tool, according to the rotation of the plane wheel achieved in various manners, is, for instance, illustrated by the diagram Fig. 10, in which, again, $e$ indicates the tool drive, $f$ the plane wheel and $g$ the tool. For instance, at N the feeding movement may be started, and, according to a predetermined developing movement, the connection between work piece and tool may be influenced by a mechanism, for instance, a differential at W, while the plane wheel N is driven under consideration of the additional movement of the tool. Further, the drive may be constant at V, and the additional movement may be considered at W. In any case, the positive connection between work piece and tool is influenced according to the rotation of the plane wheel. It is to be pointed out that it is, in principle, immaterial at which point a positive connection of the drives is started.

Having now particularly described and ascertained the nature of my said invention and in what manner the same is to be performed, I declare that what I claim is:—

1. In a spiral bevel wheel planing machine operating according to the development method, means for continuously rotating a work piece, a plane wheel, a tool, means for giving additional movement to the tool, the additional movement of the tool caused by the movement of the plane wheel being so compensated that the combined or interconnected movements of the work piece and of the work tool are changed in their respective relation according to rotation of the plane wheel.

2. A machine as claimed in claim 1, characterized by the fact that the drive of the tool is such as to prevent a relative adjustment of the tool with respect to the plane wheel during its rolling off or development movement.

3. A machine as claimed in claim 1, characterized by the fact, that the additional compensating movement and the rolling off or development movement of the work-piece or of the tool is combined with one of the three drives by one and the same gear.

4. A machine as claimed in claim 1, characterized by the fact, that the driving or actuation of the tool from the fixed part to the movable plane wheel is effected by spur wheels, whose axes are parallel to that of the plane wheel and which are arranged on two movable cranks or on connecting rods uniting the same, whereby the centres of the spur wheels in the three end points of the cranks and the fourth centre of the axis of the plane wheel coinciding with the end point of the crank form the corners of a parallelogram.

In testimony whereof I hereunto affix my signature.

HEINRICH BRANDENBERGER.